March 14, 1967     A. GOLD     3,309,104
SCOOTER
Filed July 6, 1965
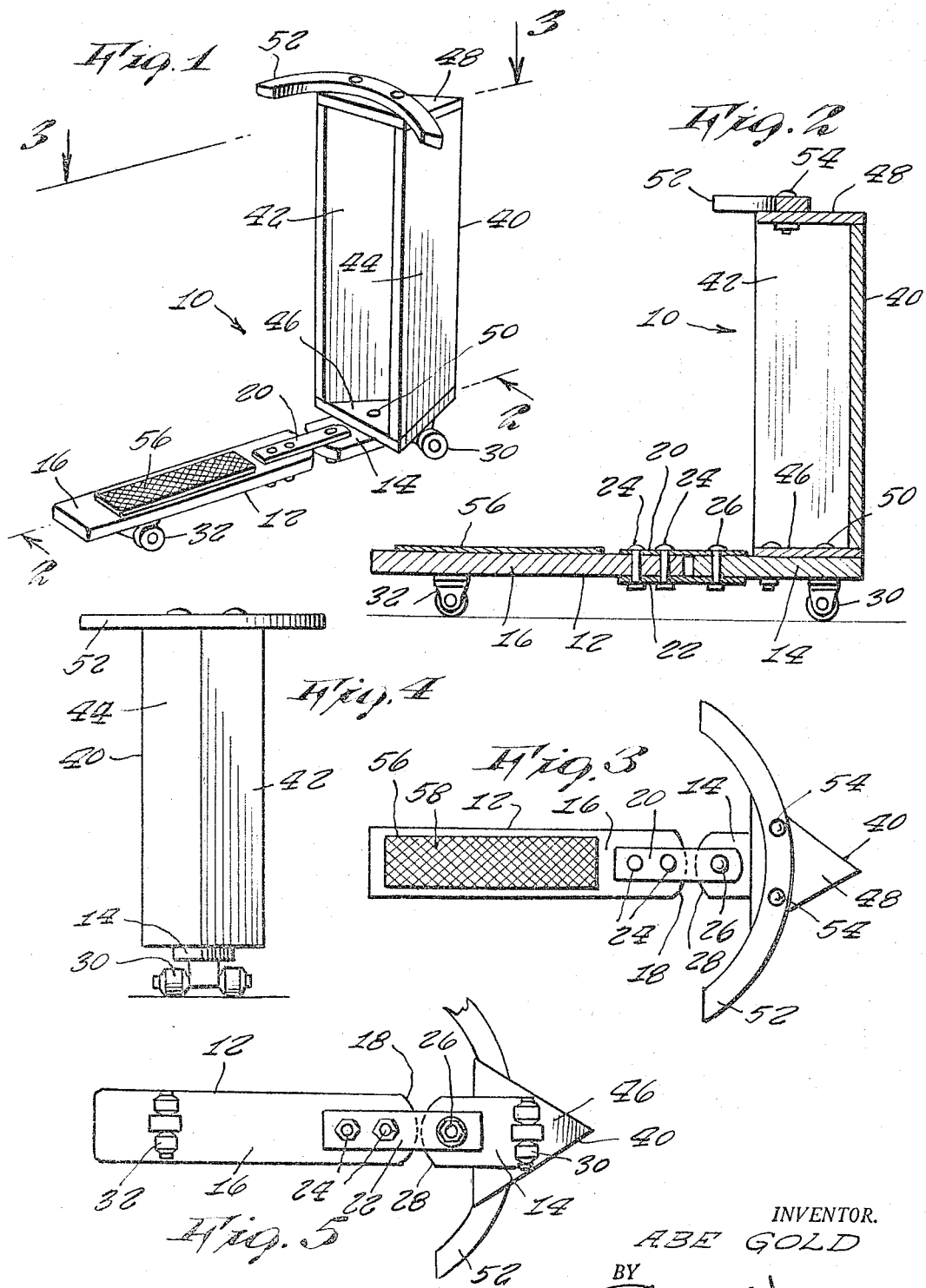
INVENTOR.
ABE GOLD
BY Carl Miller
ATTORNEY ID # United States Patent Office 3,309,104
Patented Mar. 14, 1967

3,309,104
SCOOTER
Abe Gold, 1630 New York Ave.,
Brooklyn, N.Y. 10010
Filed July 6, 1965, Ser. No. 469,687
1 Claim. (Cl. 280—87.04)

This invention relates to a foot propelled wheeled steerable operator supporting device commonly referred to as a scooter.

The primary object of this invention is to provide a two-part coplanar scooter platform interconnected for relative angular movement about a vertical axis with each part supported on a pair of ground engaging wheels, both parts being co-extensive and with the forward part steerable.

Another object of this invention is to provide the forward steerable part with an upstanding stream-lined rigid column which carries at its upper end a handle bar to facilitate steering and maneuvering of the scooter platform in use.

Still another object of this invention relates to forming the rear platform part narrow and of a length greater than the forward steerable part such as to safely and comfortably support one foot of the operator who uses his other foot to propel the scooter platform, the rear platform further being provided with a non-slipping foot engaging surface.

A further object of this invention is to so relate, dimension and form the parts of the scooter so as to provide for perfect balance of the operator thereon while at the same time providing for the safety and comfort of the operator in riding, jumping on and off, and in maneuvering the scooter on a roadway or pavement.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described within the scope of the appended claim.

FIGURE 1 is a perspective view of the scooter as viewed from the rear thereof.

FIGURE 2 is a vertical sectional view of the scooter taken on line 2—2, FIGURE 1, FIGURE 3 is a top plan view of the scooter as viewed from line 3—3, FIGURE 1, FIGURE 4 is a front elevational view of the scooter.

FIGURE 5 is a bottom plan view of the scooter.

Referring more particularly to the drawings, the scooter 10 comprises a two-part platform 12 which supports the operator in a manner as will be hereinafter described. The platform 12 is formed of a forward part 14 and a rear part 16. Both parts 14 and 16 are preferably formed of wood, are rectangular in shape, and of uniform width and thickness. The rear part 16 is of a width sufficient to accommodate one foot of the operator and may be of any desired length. Preferably the front part 14 is made of the same width as the rear part 16. Desirably, the parts 14 and 16 are to be made of a wood that is of great strength and durability, though the platform parts may also be made of metal or any other suitable material or combinations of different materials.

Arranged on the top and bottom sides of the rear part 12 at the longitudinal center thereof and extending forwardly of the front terminal end 18 thereof, are metal elongated plates or straps 20, 22, which are rigidly secured to the part 12 by bolts or other suitable fasteners 24. The straps 20, 22, receive therebetween the rear end portion of the front part 14 which is connected thereto by a bolt 26. The bolt 26 serves as steering pin about which the front part 14 turns, and the rear end 28 of the front part 14 is closely adjacent to the front end 18 of the rear part 16, and to permit relative angular movement between the parts 14 and 16, the adjacent ends 18, 28 are formed arcuate as shown in FIGURES 3 and 5. It is to be noted that the front and rear parts 14, 16 are co-extensive, coplanar and horizontal.

Provided on the underside of each of the platform parts 14, 16 is a pair of wheels 30, 32. Conventional ball bearing roller skate wheels may be utilized and are secured to the parts 14, 16 in any desired manner. While the front wheels 30 are shown positioned forwardly of the steering bolt 26, it is to be understood that the wheels 30 may be positioned such as to have their axis of rotation in a tranverse plane lying in the vertical axis of the bolt 26 or closely adjacent thereto. Thus, this placement of the wheels 30 will serve to relieve the bolt 26 and straps 20, 22 of the bending strains or stress due to the weight of the operator, permit easier turning of the front part 14 and reduce wear. Also, if desired, the front part 14 in its bearing engagement with the bolt 26, may be provided with a metal bearing sleeve or anti-friction bearing as is well known.

Mounted on the forward platform part 14 is a vertical column or post 40, that in the form shown comprises forwardly converging walls 42, 44, a bottom wall 46 and a top wall 48 rigidly secured together in any desired manner. The bottom wall 46 seats on the front part 14 and is secured thereto by the bolts 50. A handle bar 52 is positioned on the top wall 48 and is secured thereto by bolts 54. The column or post 40 is of such a height that the handle bar 52 will be positioned properly for engagement by the operator with a maximum of comfort such as to facilitate ease of steering the scooter. Due to the fact that the column or post 40 is open from the rear, the same may be provided with a basket, shelves or other container for carrying purposes.

Provided on the upper side of the rear platform part and suitably secured thereto, is a foot engaging pad 56 formed with an upper anti-slip surface 58 of any desired configuration.

While certain novel features of my invention have been shown and described and are pointed out in the annexed claim, it will be understood that various omissions, substitutions and changes in the forms and details of the device illustrated and in its operation can be made by those skilled in the art without departing from the spirit of the invention.

Having thus described my invention, I claim as new and desire to secure by Letters Patent:

A scooter comprising:
(a) a two-part platform including a front part and a rear part,
(b) upper and lower flat strap elements secured respectively to the upper and lower sides of the rear part longitudinally medially thereof and extending forwardly beyond the front end of said rear part,
(c) said upper and lower straps being of equal width and length and of a width less than the width of said rear and front parts,
(d) said front part having its rear end portion positioned between the extended portions of said upper and lower strap elements,
(e) a vertical bolt means extending through the extended portions of said upper and lower flat strap elements and through said rear end portion of said front part providing a vertical axis about which said front part turns to effect steering of the scooter,
(f) said front and rear parts being co-planar, with the rear end of the front part and the front end of the rear part being reversely arcuate and closely adjacent to each other, (g) a pair of wheels mounted on the underside of each said front and rear parts supporting the same in a horizontal plane with the pair of wheels on the front part lying forwardly of the forward terminal end of said strap elements, (h) a vertical column comprising a pair of forwardly converging vertical walls, a bottom wall and a top wall all rigidly secured together, (i) said column bottom wall being seated on said front part and secured thereto by fastener means, (j) a handle bar fixedly positioned on the top wall of said column, (k) a foot engaging pad having a non-slip upper surface secured to the upper side of said rear parts, and (l) said vertical column being open at its rear end and providing an article receiving compartment.

References Cited by the Examiner
UNITED STATES PATENTS

| | | | |
|---|---|---|---|
| 1,483,033 | 2/1924 | Wisman | 280—87.04 X |
| 1,498,427 | 6/1924 | Dean | 280—1.203 X |
| 2,045,983 | 6/1936 | Ferrigno | 280—87.04 |
| 2,134,318 | 10/1938 | Ruzich | 280—87.04 |
| 2,449,336 | 9/1948 | Spitzwieser | 280—87.02 X |
| 2,894,760 | 7/1959 | Kolstad | 280—87.04 X |
| 3,057,634 | 10/1962 | Long | 280—7.12 X |

LEO FRIAGLIA, *Primary Examiner.*